May 8, 1934. F. D. FOWLER 1,958,137
APPARATUS FOR CUTTING LENGTHS FROM A TRAVELING WEB
Filed March 23, 1933
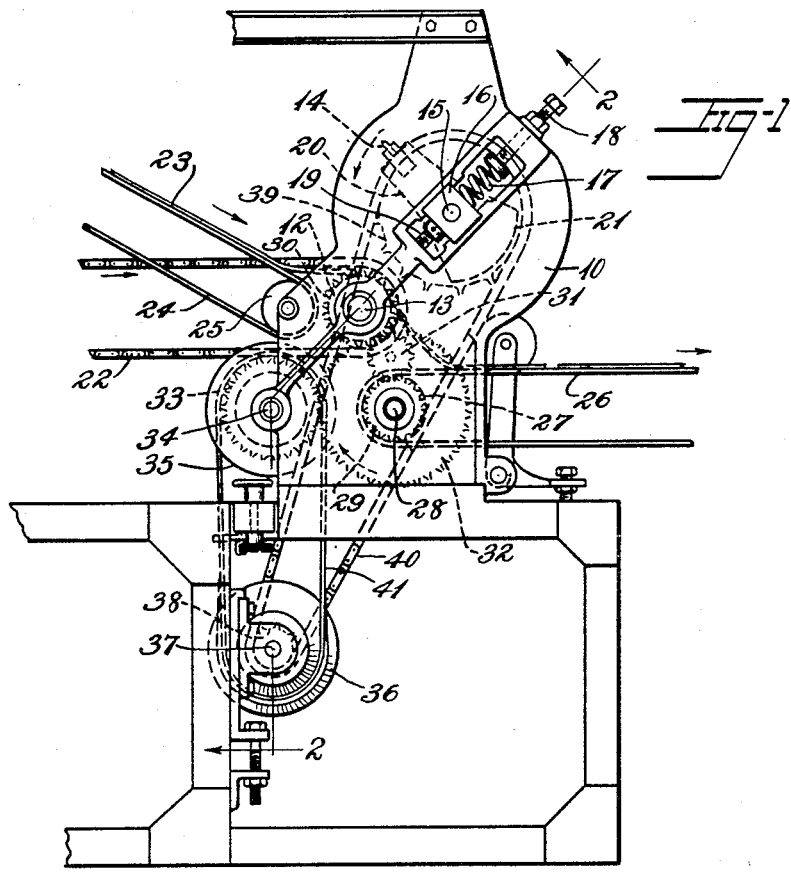
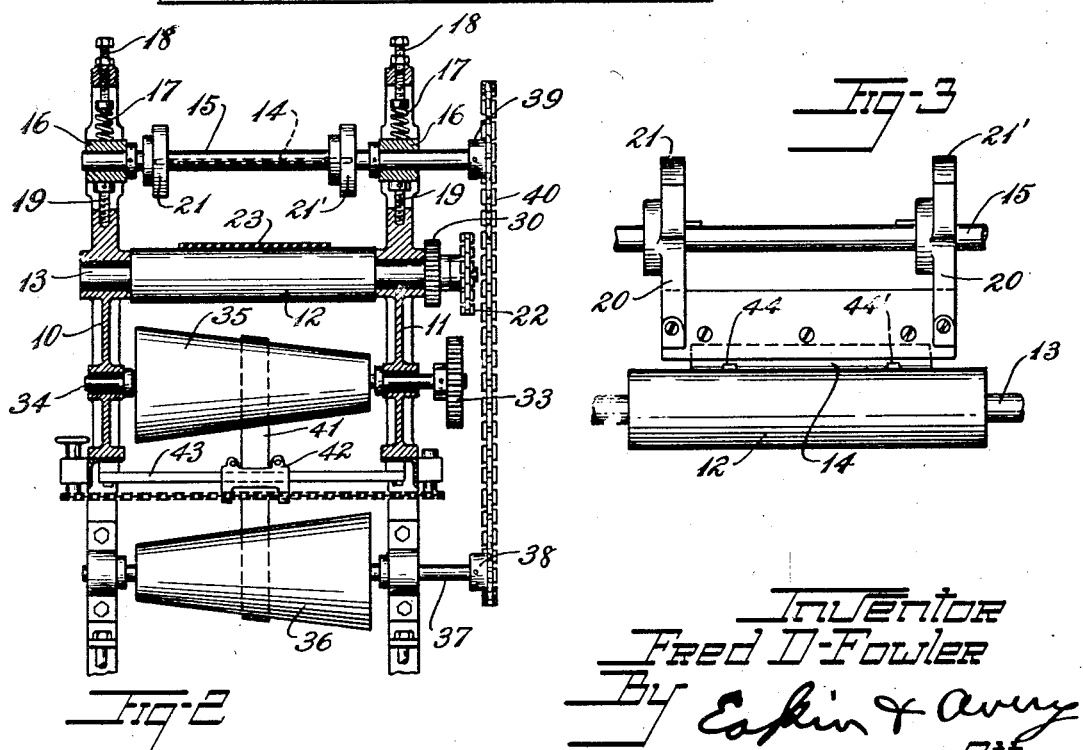
Inventor
Fred D. Fowler
By Eakin & Avery
Attys

UNITED STATES PATENT OFFICE 1,958,137

APPARATUS FOR CUTTING LENGTHS FROM A TRAVELING WEB

Fred D. Fowler, Newton, Mass., assignor to Hood Rubber Company, Inc., Watertown, Mass., a corporation of Delaware Application March 23, 1933, Serial No. 662,191

6 Claims. (Cl. 164—68)

This invention relates to apparatus for cutting lengths from a traveling web of material and is particularly useful in cutting lengths from a slab of unvulcanized rubber such as a combination heel and sole slab used in the manufacture of shoes.

The principal objects of the invention are to provide accuracy, to provide for changing the length of the cuts without the shifting of gears, and to provide efficiency of operation.

Other objects will appear from the following description and the accompanying drawing.

In the drawing:

Fig. 1 is a side elevation of the cutting apparatus as installed between receiving and delivery conveyors, only portions of the conveyors being shown.

Fig. 2 is a sectional view taken on line 2—2 of Fig. 1.

Fig. 3 is a detail view of the cutter and anvil roll.

Referring to the drawing, the device comprises a pair of rigid frame members 10, 11, between which the moving parts of the device are mounted. The cutting parts include a hardened steel anvil roll 12, mounted on a shaft 13 and a knife bar 14 mounted parallel thereto on a shaft 15. Shaft 13 is mounted in stationary bearings formed in frame members 10 and 11. Shaft 15 is journaled in bearings 16 slidably mounted in frame members 10, 11. It is urged toward shaft 13 by coil springs 17, the pressure of the springs being regulated by screws 18 which pass through the frame members and engage the springs.

In order to prevent actual contact of the knife with the anvil roll and thereby to prevent scoring of the anvil roll, limit screws 19 are provided. These are threaded in the frame members and project therefrom to engage the sliding bearings 16.

The knife bar 14 is carried by a pair of arms 20, 20', which are keyed to shaft 15. These arms are extended to provide counterweights 21, 21' to balance the knife.

Anvil roll 12 is driven by a chain 22 from any convenient source of power. The slab of material 23 is delivered to the anvil roll by a belt 24 which passes over a pulley 25 mounted near the anvil roll.

To convey the cut material from the machine a conveyor belt 26 is provided. It is driven by a roll 27 mounted on a shaft 28 journaled in the machine frame.

In order to insure separation of the cut pieces from each other the belt 26 is driven faster than the anvil roll 12. For this purpose the shaft 28 is provided with a gear 29 and the shaft 13 is provided with a slightly larger gear 30. These gears are operatively connected through an intermediate idler gear 31. The arrangement is such that conveyor 26 is driven by anvil roll 12 at a slightly increased velocity.

To provide for driving the knife-carrying shaft 15 at different velocities, shaft 28 also carries a gear wheel 32 which engages a gear 33 on a shaft 34. Shaft 34 has a cone pulley 35 fixed thereto. A similar cone pulley 36 is mounted on a shaft 37 which is parallel to shaft 34, the cones however tapering in opposite directions. Shaft 37 carries a sprocket 38 and shaft 15 carries a sprocket 39 in line therewith. A chain 40 engages sprockets 38 and 39. A light flat belt 41 engages the cones 35 and 36. A belt shipper 42 is adjustable along the rod 43. The arrangement is such that the speed of the knife shaft 15 may be adjusted through a wide range with relation to the speed of the anvil roll.

In order to cause the knife to travel at the speed of the anvil roll during that part of its travel where it engages the material being cut, the belt 41 is only slightly tensioned and made extremely narrow, the arrangement being such that when the knife is traveling faster than the anvil roll, the belt will slip when the knife starts to cut the stock permitting the knife to be carried through by the resistance of the stock, and when the knife is traveling slower than the anvil roll the belt will slip on contact of the knife with the stock permitting the knife to be carried through its cutting stroke with the stock.

In order to assure the proper advance of the leading end of each cut section to the conveyor belt 26, the knife 14 is notched slightly as at 44, 44' in one or more places so as to leave connecting threads of rubber between the cut sections. Such connecting threads will be broken by the increased velocity of the belt 26.

In the operation of the device a slab of rubber 23 is continuously supplied by the belt 24 and passes over the roll 12. The belt shipper 42 is adjusted to such a position as to cause the cutter to contact with the stock at properly timed intervals to produce cuts of the proper length, but as the knife may travel at a different velocity than the stock the slipping belt 41 permits the knife to be carried at the velocity of the material while being forced therethrough. The knife resumes its regular velocity upon leaving the stock.

I claim:

1. Apparatus for cutting sections from a strip of material, said apparatus comprising an anvil roll driven at constant velocity, a bar cutter rotatably mounted to cooperate with the anvil roll, and friction means for driving the cutter at a velocity different from that of the anvil roll and for permitting travel thereof at the velocity of the anvil roll during its engagement with the material to be cut.

2. Apparatus for cutting sections from a strip of material, said apparatus comprising an anvil roll driven at constant velocity, a bar cutter rotatably mounted to cooperate with the anvil roll, and friction means for driving the cutter at a velocity faster than that of the anvil roll and for permitting travel thereof at the velocity of the anvil roll during its engagement with the material to be cut.

3. Apparatus for cutting sections from a strip of material, said apparatus comprising an anvil roll driven at constant velocity, a bar cutter rotatably mounted to cooperate with the anvil roll, and friction means for driving the cutter at a velocity slower than that of the anvil roll and for permitting travel thereof at the velocity of the anvil roll during its engagement with the material to be cut.

4. Apparatus for cutting sections from a strip of material, said apparatus comprising an anvil roll driven at constant velocity, a bar cutter rotatably mounted to cooperate with the anvil roll, friction means for driving the cutter at a velocity different from that of the anvil roll and for permitting travel thereof at the velocity of the anvil roll during its engagement with the material to be cut, and means for adjusting the normal velocity of the cutter.

5. Apparatus for cutting sections from a strip of plastic material, said apparatus comprising an anvil roll, means for delivering strip material to the anvil roll at one velocity, means for driving the anvil roll at the same velocity, a fly-cutter adapted to cooperate with the anvil roll to cut the strip, said cutter being notched to prevent complete severance of the severed section from the strip, and means for pulling the cut sections from the cutting means at an increased velocity to complete the severance thereof.

6. Apparatus as defined by claim 5, said apparatus including friction means for driving the fly cutter at a velocity different from that of the anvil roll and permitting its travel at the velocity of the anvil roll during its engagement with the strip.

FRED D. FOWLER.